US005965304A

United States Patent [19]

Yau et al.

[11] Patent Number: 5,965,304

[45] Date of Patent: Oct. 12, 1999

[54] PROTECTING LAYER FOR GELATIN BASED AGX PHOTOGRAPHIC PRODUCTS

[75] Inventors: Hwei-ling Yau, Rochester; Wendy S. Krzemien, Hilton; Paul T. Lubberts, Rochester, all of N.Y.

[73] Assignee: Eastman Kodak Company, Rochester, N.Y.

[21] Appl. No.: 08/965,335

[22] Filed: Nov. 6, 1997

[51] Int. Cl.[6] ................................ G03C 3/00; B32B 3/00

[52] U.S. Cl. ................................ 430/11; 430/12; 430/523; 430/527; 430/531; 430/627; 430/961; 428/195; 428/205

[58] Field of Search ................................ 430/523, 11, 12, 430/527, 627, 531, 533, 634, 935, 635, 961; 428/195, 205

[56] References Cited

U.S. PATENT DOCUMENTS

| | | |
|---|---|---|
| 2,259,009 | 10/1941 | Talbot . |
| 2,331,746 | 10/1943 | Talbot . |
| 2,706,686 | 4/1955 | Hilborn . |
| 2,719,791 | 10/1955 | Land . |
| 2,751,315 | 6/1956 | Staehle . |
| 2,798,004 | 7/1957 | Weigel . |
| 2,956,877 | 10/1960 | Land et al. . |
| 3,113,867 | 12/1963 | Van Norman et al. . |
| 3,190,197 | 6/1965 | Pinder . |
| 3,397,980 | 8/1968 | Stone . |
| 3,415,670 | 12/1968 | McDonald . |
| 3,443,946 | 5/1969 | Hrabbefer et al. . |
| 3,502,501 | 3/1970 | Burczyk et al. . |
| 3,697,277 | 10/1972 | King . |
| 3,733,293 | 5/1973 | Gallagher et al. . |
| 4,092,173 | 5/1978 | Novak et al. . |
| 4,171,979 | 10/1979 | Novak et al. . |
| 4,279,945 | 7/1981 | Audran et al. . |
| 4,302,523 | 11/1981 | Audran et al. . |
| 4,333,998 | 6/1982 | Leszyk . |
| 4,426,431 | 1/1984 | Harasta et al. . |
| 4,999,266 | 3/1991 | Platzer et al. . |
| 5,179,147 | 1/1993 | Jones . |
| 5,376,434 | 12/1994 | Ogawa et al. . |
| 5,447,832 | 9/1995 | Wang et al. . |
| 5,529,891 | 6/1996 | Wang et al. . |
| 5,594,047 | 1/1997 | Nielsen et al. . |
| 5,643,972 | 7/1997 | Wang et al. . |
| 5,731,119 | 3/1998 | Eichorst et al. .......................... 430/63 |
| 5,786,298 | 7/1998 | Tsou et al. .............................. 503/227 |

FOREIGN PATENT DOCUMENTS

| | | |
|---|---|---|
| 482204 | 3/1938 | United Kingdom . |

OTHER PUBLICATIONS

*Research Disclosure,* Nov. 1992, Item 34390, entitled "Photographic Light–Sensitive Silver Halide Film Can Comprise A Transparent Magnetic Recording Layer, Usually Provided On The Backside Of The Photographic Support", pp. 869–874, Disclosed Anonymously.

*Research Disclosure,* Feb. 1995, Item 37038, entitled "Typical And Preferred Color Paper, Color Negative, and Color Reversal Photographic Elements And Processing", pp. 79–115, Disclosed Anonymously.

*Primary Examiner*—Thorl Chea
*Attorney, Agent, or Firm*—Carl F. Ruoff

[57] ABSTRACT

The present invention is an imaged photographic element which includes a support, at least one silver halide light-sensitive emulsion layer superposed on the support; and a protective overcoat furthest from the support. The protective overcoat is superposed on the silver halide light sensitive layer. The protective overcoat includes a first polymeric particle having a glass transition temperature of greater than or equal to 25° C. and a particle size of from 5 to 500 nm and a second polymeric particle having a glass transition temperature of less than 25° C. and a particle size of from 5 to 500 nm at a weight ratio of the first polymeric particle to the second polymeric particle of from 3:97 to 80:20 and wax particle having a size of from 0.01 $\mu$m to 0.5 $\mu$m. The protective overcoat is applied from an aqueous coating.

16 Claims, No Drawings

PROTECTING LAYER FOR GELATIN BASED AGX PHOTOGRAPHIC PRODUCTS

CROSS REFERENCE TO RELATED APPLICATIONS

This application relates to commonly assigned copending application Ser. No. 08/965,508, filed simultaneously herewith and hereby incorporated by reference for all that it discloses.

BACKGROUND OF THE INVENTION

Silver halide photographic elements contain light sensitive silver halide in a hydrophilic emulsion. An image is formed in the element by exposing the silver halide to light, or to other actinic radiation, and developing the exposed silver halide to reduce it to elemental silver.

In color photographic elements a dye image is formed as a consequence of silver halide development by one of several different processes. The most common is to allow a by-product of silver halide development, oxidized silver halide developing agent, to react with a dye forming compound called a coupler. The silver and unreacted silver halide are then removed from the photographic element, leaving a dye image.

In either case, formation of the image commonly involves liquid processing with aqueous solutions that must penetrate the surface of the element to come into contact with silver halide and coupler. Thus, gelatin, and similar natural or synthetic hydrophilic polymers, have proven to be the binders of choice for silver halide photographic elements. Unfortunately, when gelatin, and similar polymers, are formulated so as to facilitate contact between the silver halide crystal and aqueous processing solutions, they are not as tough and mar-resistant as would be desired for something that is handled in the way that an imaged photographic element may be handled. Thus, the imaged element can be easily marked by fingerprints, it can be scratched or torn and it can swell or otherwise deform when it is contacted with liquids.

There have been attempts over the years to provide protective layers for gelatin based photographic systems that will protect the images from damage by water or aqueous solutions. U.S. Pat. No. 2,173,480 describes a method of applying a colloidal suspension to moist film as the last step of photographic processing before drying. A series of patents describes methods of solvent coating a protective layer on the image after photographic processing is completed and are described in U.S. Pat. Nos. 2,259,009, 2,331,746, 2,798,004, 3,113,867, 3,190,197, 3,415,670 and 3,733,293. The application of UV-polymerizable monomers and oligomers on processed image followed by radiation exposure to form crosslinked protective layer is described U.S. Pat. Nos. 4,092,173, 4,171,979, 4,333,998 and 4,426,431. Major drawbacks for the solvent coating method and the radiation cure method are the health and environmental concern of those chemicals to the coating operator and the instability and relatively short shelf life of the coating solutions. U.S. Pat. Nos. 3,397,980, 3,697,277 and 4,999,266 describe methods of laminating polymeric sheet film on the processed image as the protective layer. U.S. Pat. No. 5,447,832 describes the use of a protective layer containing mixture of high and low Tg latices as the water-resistance layer to preserve the antistat property of the $V_2O_5$ layer through photographic processing. This protective layer is not applicable to the image formation layers since it will detrimentally inhibit the photographic processing. U.S. Pat. No. 2,706,686 describes a lacquer finish for photographic emulsions, with the aim of providing water- and fingerprint-resistance by coating the emulsion, prior to exposure, with a porous layer that has a high degree of water permeability to the processing solutions. After processing, the lacquer layer is fused and coalesced into a continuous, impervious coating. The porous layer is achieved by coating a mixture of a lacquer and a solid removable extender (ammonium carbonate), and removing the extender by sublimation or, dissolution during processing. The overcoat as described is coated as a suspension in an organic solvent, and thus is not compatible with current manufacturing of photographic products. U.S. Pat. No. 3,443,946 provides a roughened (matte) scratch-protective layer, but not a water-impermeable one. U.S. Pat. No. 3,502,501 provides protection against mechanical damage only; the layer in question contains a majority of hydrophilic polymeric materials, and must be permeable to water in order to maintain processability. U.S. Pat. No. 5,179,147 likewise provides a layer that is not water-protective.

In U.S. Pat. No. 5,804,341 a protective overcoat is formed by applying a coating, in the presence of a electric field, charged, clear polymeric particles to an imaged silver halide element so as to cause the particles to adhere to a surface of the imaged element and then fusing the polymeric particles. In U.S. Pat. No. 5,856,051 a protective overcoat is formed by applying a coating of hydrophobic polymer particles having an average size of 0.01 to 1 microns, a melting temperature of from 55 to 200° C. at a weight percent of 30 to 95, and gelatin at a weight percent of 5 to 70 over a silver halide light-sensitive emulsion layer. The silver halide light sensitive emulsion layer is developed to provide an imaged photographic element. The hydrophobic polymer particles are then fused to form a protective overcoat. However, there remains a need to provide protective overcoats on photographic elements without a fusing step.

Thus, there is a need to control the coefficient of friction of the overcoat layer in order to be run through photofinishing equipment and/or handled by the end-users properly. In addition, the desire to enhance the resistance of the protective layer to scratches and to prevent prints from adhering to on another in high temperature and/or high humidity is still greatly recognized.

The temperature and residence time of photographic coating in the drying section of photofinishing equipment in the trade vary from 50° C. to 70° C. and from 30 seconds to 2.5 minutes. The actual temperature of gelatin coating during drying is much lower than the temperature set for the dryer due to the evaporation of water. In addition, it is necessary to be free of volatile organic compound (VOC) in the formulation to be user and environmental friendly. Under these stringent requirements, it appears that an aqueous colloidal dispersion of a water insoluble polymeric material is an appropriate system for this technology. Water soluble materials will not provide any water resistance property.

U.S. Pat. No. 2,719,791 describes the use of an aqueous dispersion of organic plastic material, which yields a water and vapor permeable coating on drying. However, it is known that when dispersions of low Tg material ($Tg<25°$ C.) are used to obtain a water resistance protective coating, the surface of the protective coating has an undesirable tacky characteristic, which generally degrades other physical properties, such as print blocking, fingerprinting, dust attraction and high scratch propensity. When dispersions of high Tg materials ($Tg>25°$ C.) are used, it is not possible to form a continuous water resistance layer on the prints under the drying condition described above. U.S. Pat. No. 2,751,315 also describes the use of an aqueous dispersion of copolymer materials. It was recognized in this patent that low Tg materials were not suitable and therefore higher Tg polymers in combination with an organic solvent were used in order to form a water-resistant protective coating. The organic solvent that is released from the formulation during drying creates an environmental concern if used in the current photofinishing laboratories. U.S. Pat. No. 2,956,877 describes a method of applying a solution to a photographic image that solublizes the processing reagents from the photographic products as well as forming a protective coating on its surface. The acid groups on the polymer degrades the water resistant property of the final protective layer, and the organic solvent required in the formulation is not suitable for high volume photofinishing laboratories.

There remains a need for an aqueous coatable, water-resistant protective coating that can be easily coated on imaged processed photographic products and dried into a continuous coating under drying conditions typical of photographic processing equipment while not releasing volatile organic compounds and while also providing a low coefficient of friction, improved resistance to scratching and high-temperature blocking, without any adverse effect on the gloss of the photographic product.

SUMMARY OF THE INVENTION

The present invention is an imaged photographic element which includes a support, at least one silver halide light-sensitive emulsion layer superposed on the support; and a protective overcoat furthest from the support. The protective overcoat is superposed on the silver halide light sensitive layer. the protective overcoat includes a first polymeric particle having a glass transition temperature of greater than or equal to 25° C. and a particles size of from 5 to 500 nm and a second polymeric particle having a glass transition temperature of less than 25° C. and a particle size of from 5 to 500 nm at a weight ratio of the first polymeric particle to the second polymeric particle of from 3:97 to 80:20 and wax particle having a size of from 0.01 μm to 0.5 μm. The protective overcoat is applied from an aqueous coating.

DETAILED DESCRIPTION OF THE INVENTION

The present invention describes a volatile organic-solvent-free material formulation that is applied to a photographic product at the end of photographic processing and dried to form a water resistant, scratch resistant, fingerprint resistant durable overcoat. The material composition of this invention is a combination of two colloidal dispersions of water insoluble hydrophobic polymeric materials and wax particles. At least one of the polymeric materials has glass transition temperature equal to or higher than 25° C. to provide toughness and non-tacky surface properties. The second polymeric material has glass transition temperature below 25° C. in order to form a continuous film layer at the mild drying condition, such as used in typical photographic processing equipment. The weight ratio of the two polymeric materials is from 3:97 to 80:20 by weight. The average particle size of colloidal dispersions of polymeric materials is from 5 nm to 500 nm. The types of wax particles include dispersions of submicron size, from 0.01 μm to 0.5 μm wax particles such as offered commercially as aqueous dispersions of polyolefins, polypropylene, polyethylene, high density polyethylene, oxidized polyethylene, ethylene acrylic acid copolymers, microcrystalline wax, paraffin, and natural waxes. The preferred particle size for the wax particles is between 0.01 μm and 0.2 μm. The preferred amount used in the formulation is 1% to 30% by weight based on the total dry laydown of the protective overcoat formulation. The preferred melting temperature for the wax particles is higher than 60° C. The protective layer formulation with the wax particles has lower friction coefficient, improved scratch resistance and lower propensity of blocking (prints adhering face to face) in high temperature environment. The dry laydown of the total materials on the surface of photographic product is from 0.3 $g/m^2$ to 6 $g/m^2$. Other components commonly used in photographic processing solutions, such as biocides, spreading aids (surfactants), and lubricants can also be incorporated in the formulation as needed. The concentration of the formulation can be from 1% solids to 50% solids depending on the desired thickness of the protective layer, the machine speed, the dryer efficiency and other factors that may affect the application to the photographic product.

The colloidal dispersions of hydrophobic polymers used for the first or second polymeric particle in the present invention are generally latexes or hydrophobic polymers of any composition that can be stabilized in an water-based medium. Such hydrophobic polymers are generally classified as either condensation polymers or addition polymers. Condensation polymers include, for example, polyesters, polyamides, polyurethanes, polyureas, polyethers, polycarbonates, polyacid anhydrides, and polymers comprising combinations of the above-mentioned types. Addition polymers are polymers formed from polymerization of vinyl-type monomers including, for example, allyl compounds, vinyl ethers, vinyl esters, vinyl heterocyclic compounds, styrenes, olefins and halogenated olefins, unsaturated acids and esters derived from them, unsaturated nitriles, vinyl alcohols, acrylamides and methacrylamides, vinyl ketones, multifunctional monomers, or copolymers formed from various combinations of these monomers. Such latex polymers can be prepared in aqueous media using well-known free-radical emulsion polymerization methods and may consist of homopolymers made from one type of the above-mentioned monomers or copolymers made from more than one type of the above-mentioned monomers. Polymers comprising monomers which form water-insoluble homopolymers are preferred, as are copolymers of such monomers. Preferred polymers may also comprise monomers which give water-soluble homopolymers, if the overall polymer composition is sufficiently water-insoluble to form a latex. The aqueous phase of the latex or colloidal dispersion of the invention may contain water-soluble polymers in order to control, for example, the viscosity and flow characteristics. The aqueous phase may also include surfactants of the cationic, anionic, zwitterionic or non-ionic types. Further listings of suitable monomers for addition type polymers are found in U.S. Pat. No. 5,594,047 incorporated herein by reference.

This present invention uses wax particles in addition to two latex dispersions to improve the physical properties of the protective layer, such as reducing the coefficient of friction, improving scratch resistance and minimizing blocking propensity in high temperature environment without adversely affecting the gloss appearance of the photographic prints.

The photographic products according to the present invention have the unique features of water resistance, improved scratch resistance and improved thermal blocking performance. In addition, volatile organic solvents or compounds are not released from the formulation.

The imaged photographic elements protected in accordance with this invention are derived from silver halide photographic elements that can be black and white elements (for example, those which yield a silver image or those which yield a neutral tone image from a mixture of dye forming couplers), single color elements or multicolor elements. Multicolor elements typically contain dye image-forming units sensitive to each of the three primary regions of the spectrum. The imaged elements can be imaged elements which are viewed by transmission, such a negative film images, reversal film images and motion picture prints or they can be imaged elements that are viewed by reflection, such a paper prints. Because of the amount of handling that can occur with paper prints and motion picture prints, they are preferred imaged photographic elements for use in this invention.

The photographic elements in which the images to be protected are formed can have the structures and components shown in Research Disclosure 37038. Specific photographic elements can be those shown on pages 96–98 of Research Disclosure 37038 as Color Paper Elements 1 and 2. A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent (for example, a film support) or reflective (for example, a paper support). Photographic elements protected in accordance with the present invention may also include a magnetic recording material as described in Research Disclosure, Item 34390, November 1992, or a transparent magnetic recording layer such as a layer containing magnetic particles on the underside of a transparent support as described in U.S. Pat. No. 4,279,945 and U.S. Pat. No. 4,302,523.

Suitable silver halide emulsions and their preparation, as well as methods of chemical and spectral sensitization, are described in Sections I through V of Research Disclosure 37038. Color materials and development modifiers are described in Sections V through XX of Research Disclosure 37038. Vehicles are described in Section II of Research Disclosure 37038, and various additives such as brighteners, antifoggants, stabilizers, light absorbing and scattering materials, hardeners, coating aids, plasticizers, lubricants and matting agents are described in Sections VI through X and XI through XIV of Research Disclosure 37038. Processing methods and agents are described in Sections XIX and XX of Research Disclosure 37038, and methods of exposure are described in Section XVI of Research Disclosure 37038.

Photographic elements typically provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like). Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like.

Photographic elements can be imagewise exposed using a variety of techniques. Typically exposure is to light in the visible region of the spectrum, and typically is of a live image through a lens. Exposure can also be to a stored image (such as a computer stored image) by means of light emitting devices (such as LEDs, CRTs, etc.).

Images can be developed in photographic elements in any of a number of well known photographic processes utilizing any of a number of well known processing compositions, described, for example, in T. H. James, editor, The Theory of the Photographic Process, 4th Edition, Macmillan, New York, 1977. In the case of processing a color negative element, the element is treated with a color developer (that is one which will form the colored image dyes with the color couplers), and then with an oxidizer and a solvent to remove silver and silver halide. In the case of processing a color reversal element, the element is first treated with a black and white developer (that is, a developer which does not form colored dyes with the coupler compounds) followed by a treatment to render developable unexposed silver halide (usually chemical or light fogging), followed by treatment with a color developer. Development is followed by bleach-fixing, to remove silver or silver halide, washing and drying.

The present invention is illustrated by the following examples.

EXAMPLES

Material Preparation:

Commercially available materials were dialyzed against distilled water for 16 hours using membrane with molecular weight cutoff of 20,000 to remove organic solvent and excess surfactants and salts.

Glass Transition Temperature (Tg) and Melting Temperature (Tm)

Both glass transition temperature (Tg) and melting temperature (Tm) of the dry polymer material were determined by differential scanning calorimetry (DSC), using a ramping rate of 20° C./minute. Tg is defined herein as the inflection point of the glass transition. Tm is defined herein as the peak of the melting transition. The glass transition temperatures and melting temperature of materials used in this invention are listed in Table 1 and Table 2.

TABLE 1

| ID | Name | Source | Material Class | Tg (°C.) |
|---|---|---|---|---|
| P1 | AVI* | Kodak | Vinylidene chloride copolymer | 46 |
| P2 | Joncryl ECO2189 | SC Johnson | Acrylic emulsion polymer | 98 |
| P3 | Joncryl ECO2177 | SC Johnson | Acrylic emulsion polymer | 21 |
| P4 | Witcobond W-234 | Witco | Polyurethane | −39 |

*AVI is a terpolymer latex made by conventional emulsion polymerization method, consisting of acrylonitrile, vinylidine chloride and acrylic acid at the weight ratio of 15:79:6.

Particle Size Measurement

The average particle size of wax particle dispersion was measured by photon correlation spectroscopy. The results are shown in Table 2.

TABLE 2

| ID | Name | Source | Material Class | Particle size (nm) | Tm (° C.) |
|---|---|---|---|---|---|
| W1 | Jonwax 26 | S.C. Johnson | high density polyethylene | 50 | 131 |
| W2 | ME39235 | Michelman | high density polyethylene | 40 | 129 |
| W3 | ML-160 | Michelman | Carnauba | 109 | 88 |
| W4 | ME77030 | Michelman | paraffin/polyethylene | 382 | 59 & 119 (2 Tm's) |
| W5 | CC392-AS25 | ChemCor | polyethylene | 148 | 129 |
| W6 | CC325N35 | ChemCor | high density polyethylene | 54 | 131 |
| W7 | CC392N35 | ChemCor | high density polyethylene | 50 | 131 |
| W8 | CC Opacifier 341 | ChemCor | ethylene-acrylic acid copolymer | 79 | 99 |
| W9 | ME72040 | Michelman | epolene-polyolefin resin | 207 | 108 |
| W10 | ME02925 | Michelman | polyethylene | 45 | 95 |
| W11 | CC XL-21 | ChemCor | polyethylene | 509 | 115 |

Sample Preparation:

All samples were prepared by coating aqueous colloidal dispersions on the unexposed/processed (Dmin) Kodak Edge 5 Ektacolor paper at 3 cc/sq.ft. with dryer temperature @ 140° F. to simulate tail-end of photofinishing process. Small amount of FT-248, an anionic fluorosurfactant available from Bayer AG, (used at 0.1% to 4% based on the total dry laydown of the layer, other surface active compounds can also be used) was used in the formulation to control the surface tension during coating.

Test for Water Resistance

Ponceau Red dye is known to stain gelatin through the ionic interaction. Ponceau red dye solution was prepared by dissolving 1 gram dye in 1000 grams mixture of acetic acid and water (5 parts:95 parts). Samples were soaked in the dye solution for 5 minutes followed by a 30-second water rinse to removed excess dye solution on the coating surface, then air dried. A sample with good water resistant protective layer does not change the appearance by the test. A sample would showed very dense red color if there was no protective overcoat applied to the surface or the formulation did not form a continuous overcoat layer under the drying condition specified above to provide water resistance property.

Test for Durability on Wet Wiping

An approximately 1 inch-diameter water droplet was placed on the sample surface for 10 minutes. The excess water was then gently wiped up with a paper towel. This treated area was then rubbed with a dry paper towel for 40 passes under a pressure of 0.75 psi (500 grams over a 1.375 inch-diameter area). The scratches generated by the rubbing test were rated according to the description below. Higher ratings are more desirable.

Scratch Resistance Ratings:

0 . . . Totally abraded/worn

1 . . . Dense scratches with associated haze band

2 . . . Numerous scratches with associated haze band

3 . . . Few scratches with associated haze band

4 . . . Dense, heavy scratches

5 . . . Numerous, heavy scratches

6 . . . Few, heavy scratches

7 . . . Dense, heavy scratches

8 . . . Numerous, light scratches

9 . . . Few, light scratches

10 . . . No visible damage

Test for Dry Scratch Resistance

Each sample was rubbed with a dry paper towel for 40 passes under a pressure of 0.75 psi (500 grams over a 1.375 inch-diameter area). The scratches generated by the rubbing test were rated the same way as for wet wiping test described previously.

Test for Thermal Blocking 3.5×4 sq. in. samples were preconditioned in 50% RH/60° C. for 2 hours, then placed face-to-face (the overcoat layer of one sample being in contact with the same overcoat of the other sample) in for 6 hours with 1000 grams weight placed on top of the samples. The samples were pulled apart and evaluated according to the following scale:

10 . . . no adhesion, no tack

9 . . . very slight tack (aural observation)

8 . . . slight tack (aural observation)

7 . . . slight picking (visual observation)

6 . . . moderate picking

5 . . . significant picking

4 . . . 0–25% coating removal

3 . . . 25–50% coating removal

2 . . . 50–75% coating removal

1 . . . 100% coating removal (i.e. complete failure)

A ranking of 10 is most desirable, a ranking of 7 to 9 is also acceptable.

Gloss

Gloss measurement of samples was done on Gardner micro-tri-gloss meter, taking the average of five readings at 20-degree angle.

Coefficient of Friction

The kinetic coefficient of friction between a Carbide ball sled and the protective overcoat was measured and reported. All samples were condition in 70° F./50% RH for at least 17 hours prior to the test.

Example 1

Sample No. 1 was prepared with the protective overcoat consisting of P1 and P2 at 100 mg/sq.ft each. Sample No. 26 was prepared with the protective overcoat consisting of P2 and P3 at 100 mg/sq.ft. each. A series of samples similar to these two samples except the addition of wax particles in the protective overcoat formulation were prepared as described in Table 3. All samples showed superior water resistance property on Ponceau red dye staining test. The coefficient of friction of all samples containing wax particles were lower than that without wax particles (e.g. sample No. 1 and sample No. 26) as expected. Also shown in Table 3 is the gloss of each sample, it is very apparent that when the particle size of wax particles exceeded 200 nm, the appearance of a print suffered from inferior gloss.

TABLE 3

| Sample ID | Composition of protective layer | Comment | Particle size of wax particles (nm) | Coefficient of Friction | Gloss |
|---|---|---|---|---|---|
| 1 | see description above | comparison | | 0.668 | 71.4 |
| 2 | as No.1 except add W1 @ 10 mg/sq.ft. | Invention | 50 | 0.516 | 71.4 |
| 3 | as No.1 except add W1 @ 20 mg/sq.ft. | Invention | 50 | 0.456 | 71.1 |
| 4 | as No.1 except add W1 @ 30 mg/sq.ft. | Invention | 50 | 0.427 | 71.1 |
| 5 | as No.1 except add W1 @ 40 mg/sq.ft. | Invention | 50 | 0.405 | 70.5 |
| 6 | as No.1 except add W1 @ 50 mg/sq.ft. | Invention | 50 | 0.388 | 70.1 |
| 7 | as No.1 except add W1 @ 60 mg/sq.ft. | Invention | 50 | 0.359 | 69.9 |
| 8 | as No.1 except add W2 @ 10 mg/sq.ft. | Invention | 40 | 0.544 | 70.1 |
| 9 | as No.1 except add W2 @ 30 mg/sq.ft. | Invention | 40 | 0.470 | 70.9 |
| 10 | as No.1 except add W2 @ 50 mg/sq.ft. | Invention | 40 | 0.499 | 72.4 |
| 11 | as No.1 except add W3 @ 10 mg/sq.ft. | Invention | 109 | 0.339 | 70.6 |
| 12 | as No.1 except add W3 @ 30 mg/sq.ft. | Invention | 109 | 0.268 | 68.9 |
| 13 | as No.1 except add W3 @ 50 mg/sq.ft. | Invention | 109 | 0.255 | 68.7 |
| 14 | as No.1 except add W4 @ 10 mg/sq.ft. | comparison | 382 | 0.341 | 67.9 |
| 15 | as No.1 except add W4 @ 30 mg/sq.ft. | comparison | 382 | 0.293 | 63.1 |
| 16 | as No.1 except add W4 @ 50 mg/sq.ft. | comparison | 382 | 0.273 | 56.8 |
| 17 | as No.1 except add W5 @ 30 mg/sq.ft. | Invention | 148 | 0.467 | 70.5 |
| 18 | as No.1 except add W6 @ 30 mg/sq.ft. | Invention | 54 | 0.488 | 71.7 |
| 19 | as No.1 except add W7 @ 30 mg/sq.ft. | Invention | 50 | 0.499 | 71.4 |
| 20 | as No.1 except add W8 @ 30 mg/sq.ft. | Invention | 79 | 0.405 | 69.2 |
| 21 | as No.1 except add W9 @ 10 mg/sq.ft. | comparison | 207 | 0.418 | 70.1 |
| 22 | as No.1 except add W9 @ 30 mg/sq.ft. | comparison | 207 | 0.358 | 67.3 |
| 23 | as No.1 except add W9 @ 50 mg/sq.ft. | comparison | 207 | 0.343 | 67.7 |
| 24 | as No.1 except add W10 @ 10 mg/sq.ft. | Invention | 45 | 0.441 | 70.9 |
| 25 | as No.1 except add W11 @ 30 mg/sq.ft. | Invention | 509 | 0.218 | 48.0 |
| 26 | see description above | comparison | | 0.663 | 72.7 |
| 27 | as No.26 except add W1 @ 30 mg/sq.ft. | Invention | 50 | 0.330 | 70.1 |
| 28 | as No.26 except add W2 @ 30 mg/sq.ft. | Invention | 40 | 0.331 | 72.6 |
| 29 | as No.26 except add W3 @ 30 mg/sq.ft. | Invention | 109 | 0.237 | 69.3 |
| 30 | as No.26 except add W4 @ 30 mg/sq.ft. | comparison | 382 | 0.240 | 58.9 |
| 31 | as No.26 except add W5 @ 30 mg/sq.ft. | Invention | 148 | 0.353 | 70.4 |
| 32 | as No.26 except add W6 @ 30 mg/sq.ft. | Invention | 54 | 0.327 | 72.6 |
| 33 | as No.26 except add W7 @ 30 mg/sq.ft. | Invention | 50 | 0.325 | 72.3 |
| 34 | as No.26 except add W8 @ 30 mg/sq.ft. | Invention | 79 | 0.399 | 69.9 |
| 35 | as No.26 except add W11 @ 30 mg/sq.ft. | comparison | 509 | 0.327 | 70.0 |
| 36 | as No.26 except add W10 @ 30 mg/sq.ft. | Invention | 45 | 0.383 | 73.4 |

Example 2

Selected samples from Example 1 were tested for durability on wet wiping and dry scratches following the procedure described previously. The ratings of tested samples are shown in Table 4 below. As indicated by the higher ratings relative to the comparison sample without wax particles, the addition of wax particles in the protective layer formulation greatly improved the resistance of the print to scratches regardless of a wet sample or a dry sample. It is also noticed that a diminished improvement in scratch resistance was observed (e.g. sample No. 7) when the wax particles were used at higher than 20% by weight of the total laydown of the protective overcoat. It is reminded that samples containing W4, W9 or W11 also showed improvement in scratch resistance, however the gloss appearance was degraded badly as pointed out in Example 1.

TABLE 4

| Sample ID | Composition of protective layer | Comment | dry scratch resistance | durability on wet wiping |
|---|---|---|---|---|
| 1 | see description above | comparison | 5 | 4 |
| 2 | as No.1 except add W1 @ 10 mg/sq.ft. | Invention | 9 | 9 |
| 3 | as No.1 except add W1 @ 20 mg/sq.ft. | Invention | 10 | 9 |
| 4 | as No.1 except add W1 @ 30 mg/sq.ft. | Invention | 9 | 9 |
| 5 | as No.1 except add W1 @ 40 mg/sq.ft. | Invention | 5 | 9 |
| 6 | as No.1 except add W1 @ 50 mg/sq.ft. | Invention | 6 | 5 |
| 7 | as No.1 except add W1 @ 60 mg/sq.ft. | Invention | 5 | 5 |
| 8 | as No.1 except add W2 @ 10 mg/sq.ft. | Invention | 8 | 8 |
| 9 | as No.1 except add W2 @ 30 mg/sq.ft. | Invention | 9 | 9 |
| 10 | as No.1 except add W2 @ 50 mg/sq.ft. | Invention | 6 | 5 |
| 12 | as No.1 except add W3 @ 30 mg/sq.ft. | Invention | 9 | 6 |
| 13 | as No.1 except add W3 @ 50 mg/sq.ft. | Invention | 9 | 6 |
| 14 | as No.1 except add W4 @ 10 mg/sq.ft. | comparison | 9 | 8 |
| 15 | as No.1 except add W4 @ 30 mg/sq.ft. | comparison | 9 | 9 |
| 16 | as No.1 except add W4 @ 50 mg/sq.ft. | comparison | 10 | 6 |
| 17 | as No.1 except add W5 @ 30 mg/sq.ft. | Invention | 8 | 9 |
| 18 | as No.1 except add W6 @ 30 mg/sq.ft. | Invention | 10 | 9 |

TABLE 4-continued

| Sample ID | Composition of protective layer | Comment | dry scratch resistance | durability on wet wiping |
|---|---|---|---|---|
| 19 | as No.1 except add W7 @ 30 mg/sq.ft. | Invention | 8 | 9 |
| 20 | as No.1 except add W8 @ 30 mg/sq.ft. | Invention | 10 | 9 |
| 21 | as No.1 except add W9 @ 10 mg/sq.ft. | comparison | 9 | 8 |
| 22 | as No.1 except add W9 @ 30 mg/sq.ft. | comparison | 9 | 9 |
| 23 | as No.1 except add W9 @ 50 mg/sq.ft. | comparison | 9 | 5 |
| 24 | as No.1 except add W10 @ 10 mg/sq.ft. | Invention | 9 | 9 |
| 25 | as No.1 except add W11 @ 30 mg/sq.ft. | Invention | 9 | 9 |
| 26 | see description above | Invention | 9 | 8 |
| 30 | as No.26 except add W4 @ 30 mg/sq.ft. | comparison | 9 | 9 |
| 31 | as No.26 except add W5 @ 30 mg/sq.ft. | Invention | 9 | 9 |
| 32 | as No.26 except add W6 @ 30 mg/sq.ft. | Invention | 10 | 8 |
| 33 | as No.26 except add W7 @ 30 mg/sq.ft. | Invention | 10 | 8 |
| 34 | as No.26 except add W8 @ 30 mg/sq.ft. | Invention | 10 | 7 |
| 35 | as No.26 except add W11 @ 30 mg/sq.ft. | comparison | 10 | 8 |

Example 3

Selected samples from Example 1 were tested for thermal blocking propensity following the procedure described previously. The ratings of tested samples are shown in Table 5 below. As indicated by the higher ratings compared to the comparison without wax particles, the addition of wax particles in the protective layer formulation significantly reduced the propensity of two prints to adhere to each other when being in contact face-to-face in high temperature environment. However, it is also indicated in Table 4 that the melting temperature of wax particle is preferred to be higher than 60° C. so as not to create a undesirable white mess on the surface of the print due to the melting of wax in well as high temperature environment. W4 consists of low melting component (59° C.) as well as a high melting component (119° C.), and apparently the low melting component (paraffin) melted during the test.

TABLE 5

| Sample ID | Composition of protective layer | Comment | Melting temperature of wax particles (C) | Thermal Blocking (60 C/50% RH/ 6 hrs) |
|---|---|---|---|---|
| 1 | see description above | comparison | | 4 |
| 2 | as No.1 except add W1 @ 10 mg/sq.ft. | Invention | 131 | 4 |
| 3 | as No.1 except add W1 @ 20 mg/sq.ft. | Invention | 131 | 5 |
| 4 | as No.1 except add W1 @ 30 mg/sq.ft. | Invention | 131 | 5 |
| 5 | as No.1 except add W1 @ 40 mg/sq.ft. | Invention | 131 | 5 |
| 6 | as No.1 except add W1 @ 50 mg/sq.ft. | Invention | 131 | 5 |
| 7 | as No.1 except add W1 @ 60 mg/sq.ft. | Invention | 131 | 6 |
| 11 | as No.1 except add W3 @ 10 mg/sq.ft. | Invention | 88 | 6 |
| 12 | as No.1 except add W3 @ 30 mg/sq.ft. | Invention | 88 | 7 |
| 13 | as No.1 except add W3 @ 50 mg/sq.ft. | Invention | 88 | 8 |
| 14 | as No.1 except add W4 @ 10 mg/sq.ft. | comparison | 59 & 119 | wax melt on the surface |
| 15 | as No.1 except add W4 @ 30 mg/sq.ft. | comparison | 59 & 119 | wax melt on the surface |
| 16 | as No.1 except add W4 @ 50 mg/sq.ft. | comparison | 59 & 119 | wax melt on the surface |

The invention has been described in detail with particular reference to certain preferred embodiments thereof, but it will be understood that variations and modifications can be effected within the spirit and scope of the invention.

What is claimed is:

1. An imaged photographic element having a protective overcoat thereon, the protective overcoat formed by the steps comprising;

providing an imaged photographic element after processing having at least one silver halide light-sensitive emulsion layer having an image thereon;

applying an aqueous coating comprising a colloidal dispersion of a first polymeric particle having a glass transition temperature of greater than or equal to 25° C. and a particle size of from 5 to 500 nm and a second polymeric particle having a glass transition temperature of less than 25° C. and a particle size of from 5 to 500 nm and wax particles having a size of from 0.01 to 0.2 $\mu$m wherein the wax particles comprise a material selected from the group consisting of polypropylenes, polyethylenes and carnaurba wax wherein the wax particles have a melting point greater than 60° C. over the at least one silver halide light-sensitive emulsion layer wherein a weight ratio of the first polymeric particle to the second polymeric particle is from 3:97 to 80:20; and drying the aqueous coating to provide an imaged photographic element having the protective overcoat.

2. The imaged photographic element having the protective overcoat of claim 1 wherein the aqueous coating has a solids concentration of from 1 to 50 percent.

3. The imaged photographic element having the protective overcoat of claim 1 wherein the first polymeric material comprises a polymer selected from the group consisting of polyesters, polyamides, polyurethanes, polyureas, polyethers, polycarbonates, polyacid anhydrides and addition polymers.

4. The imaged photographic element having the protective overcoat of claim 1 wherein the second polymeric material comprises a polymer selected from the group consisting of polyesters, polyamides, polyurethanes, polyureas, polyethers, polycarbonates, polyacid anhydrides and addition polymers.

5. The imaged photographic element having the protective overcoat of claim 1 wherein the imaged photographic element is a photographic image on a transparent support.

6. The imaged photographic element having the protective overcoat of claim 1 wherein the imaged photographic element is a photographic image on a reflective support.

7. The imaged photographic element having the protective overcoat of claim 1 wherein the aqueous coating further comprises biocides, surfactants and lubricants.

8. An imaged photographic element comprising:

a support;

at least one processed silver halide light-sensitive emulsion layer superposed on the support having a image thereon; and protective overcoat furthest from the support superposed on the at least one silver halide light sensitive layer, the protective layer comprising a first polymeric particle having a glass transition temperature of greater than or equal to 25° C. and a particle size of from 5 to 500 nm and a second polymeric particle having a glass transition temperature of less than 25° C. and a particle size of from 5 to 500 nm at a weight ratio of the first polymeric particle to the second polymeric particle of from 3:97 to 80:20 and wax particles having a size of from 0.01 $\mu$m to 0.2 $\mu$m wherein the wax particles comprise a material selected from the group consisting of polypropylenes, polyethylenes and carnaurba wax wherein the wax particles have a melting point greater than 60° C.

9. The imaged photographic element having the protective overcoat of claim 8 wherein the first polymeric material comprises a polymer selected from the group consisting of polyesters, polyamides, polyurethanes, polyureas, polyethers, polycarbonates, polyacid anhydrides and addition polymers.

10. The imaged photographic element having the protective overcoat of claim 8 wherein the second polymeric material comprises a polymer selected from the group consisting of polyesters, polyamides, polyurethanes, polyureas, polyethers, polycarbonates, polyacid anhydrides and addition polymers.

11. The imaged photographic element having the protective overcoat of claim 8 wherein the support is transparent.

12. The imaged photographic element having the protective overcoat of claim 8 wherein the support is reflective.

13. The imaged photographic element of claim 8 wherein the protective overcoat further comprises biocides, surfactants and lubricants.

14. The imaged photographic element of claim 8 further comprising an antistatic layer superposed on the support.

15. The imaged photographic element of claim 8 further comprising a transparent magnetic layer superposed on the support.

16. The imaged photographic element of claim 8 wherein the wax particles comprises from 1 to 30 weight percent of the protective overcoat.

* * * * *